(12) United States Patent
O'Donnell

(10) Patent No.: US 8,642,173 B2
(45) Date of Patent: Feb. 4, 2014

(54) SCREEN PROTECTOR FILM

(71) Applicant: Dennis P. O'Donnell, Philadelphia, PA (US)

(72) Inventor: Dennis P. O'Donnell, Philadelphia, PA (US)

( * ) Notice: Subject to any disclaimer, the term of this patent is extended or adjusted under 35 U.S.C. 154(b) by 0 days.

(21) Appl. No.: 13/667,537

(22) Filed: Nov. 2, 2012

(65) Prior Publication Data

US 2013/0045372 A1 Feb. 21, 2013

Related U.S. Application Data

(63) Continuation of application No. 13/588,420, filed on Aug. 17, 2012.

(60) Provisional application No. 61/524,931, filed on Aug. 18, 2011.

(51) Int. Cl.
*B32B 7/12* (2006.01)

(52) U.S. Cl.
USPC ............ 428/354; 428/343; 428/355 AC; 428/41.7; 428/213; 428/215; 428/423.1; 428/423.7; 428/355 RA

(58) Field of Classification Search
None
See application file for complete search history.

(56) References Cited

U.S. PATENT DOCUMENTS

| | | | |
|---|---|---|---|
| 6,660,388 B2 | 12/2003 | Liu et al. | |
| 6,926,945 B2 | 8/2005 | Yano et al. | |
| 7,070,837 B2 | 7/2006 | Ross | |
| 7,101,616 B2 | 9/2006 | Arney et al. | |
| 7,267,850 B2 | 9/2007 | Coggio et al. | |
| 7,554,615 B2 | 6/2009 | Harada et al. | |
| 7,986,450 B2 | 7/2011 | Cao et al. | |
| 8,044,942 B1 | 10/2011 | Leonhard et al. | |
| 8,068,331 B2 | 11/2011 | Sauers et al. | |
| 8,137,788 B2 | 3/2012 | Takada et al. | |
| 8,163,383 B2 | 4/2012 | Kameshima et al. | |
| 8,178,198 B2 | 5/2012 | Maeda et al. | |
| 8,182,899 B2 | 5/2012 | Nagahama et al. | |
| 2002/0114934 A1 * | 8/2002 | Liu et al. ................ | 428/212 |
| 2007/0077420 A1 | 4/2007 | Worthen et al. | |
| 2007/0286984 A1 | 12/2007 | Wright | |
| 2008/0174140 A1 * | 7/2008 | McCormick et al. ........ | 296/84.1 |
| 2010/0279088 A1 | 11/2010 | Naito et al. | |
| 2011/0043727 A1 | 2/2011 | Bösl et al. | |
| 2011/0076475 A1 | 3/2011 | Kim et al. | |
| 2011/0111240 A1 | 5/2011 | Yuan et al. | |
| 2011/0129643 A1 | 6/2011 | Uchida et al. | |
| 2011/0216020 A1 | 9/2011 | Lee et al. | |
| 2011/0223703 A1 | 9/2011 | Doi et al. | |
| 2011/0267793 A1 * | 11/2011 | Cohen et al. .............. | 361/807 |
| 2012/0043015 A1 | 2/2012 | Feller | |
| 2013/0045371 A1 * | 2/2013 | O'Donnell ............... | 428/215 |

OTHER PUBLICATIONS

Erin, Biba, "Coming Soon: Displays on Your Cars Windshield?", PC World, Mar. 1, 2005.*
Brochure of "Argotec 46510", date unavailable.*
Istvan, Benedek et al., "Pressure-Sensitive Adhesives Technology", Marcel Dekker, Inc., Chapter 1, pp. 1-3, 1997.*

* cited by examiner

*Primary Examiner* — Callie Shosho
*Assistant Examiner* — Anish Desai
(74) *Attorney, Agent, or Firm* — Symbus Law Group, LLC; Clifford D. Hyra

(57) ABSTRACT

A multi-layer screen protector for digital display screens, such as LCD's, cell phones, tablets, laptops, and pad computer devices, that may be readily applied without the need for special tools and in dusty environments, the screen protector being designed and die-cut to match the shape of the digital display screen, including cut-outs for cameras, microphones and device buttons, where the top surface is a layer of polycaprolactone aliphatic urethane that is connected to a bottom layer made from plastic such as polystyrene, acrylic and/or polyethylene terephthalate, and a self-wetting adhesive layer provided on the bottom surface of the bottom polystyrene, acrylic and/or polyethylene terephthalate layer. The screen protector provides an optically clear view of the device and is constructed with the abrasion resistant layer being provided and supported on a plastic layer and may be removed and reinstalled.

9 Claims, 2 Drawing Sheets

SCREEN PROTECTOR FILM

CROSS-REFERENCE TO RELATED APPLICATIONS

This application is a continuation of, and claims priority to, U.S. application Ser. No. 13/588,420, filed on Aug. 17, 2012, now abandoned, which claims priority to U.S. Provisional Patent Application Ser. No. 61/524,931, filed on Aug. 18, 2011, the complete contents of which are herein incorporated by reference.

BACKGROUND OF THE INVENTION

1. Field of the Invention

The present invention relates to the field of screen protectors for touch screen displays, and more particularly to a removable, repositionable protective film for a touch screen display.

2. Brief Description of the Related Art

Touch screens are widely used, including in portable electronic devices, such as, cellular telephones and portable computing devices, including readers and tablets, such as the popular iPad®. A factor owing to the popularity of these electronic touch screen devices is their portability. The devices are generally lightweight, or compact. As a result, users often carry and use these electronic devices when traveling or when participating in daily activities. In many cases, the touch screens of these electronic devices come in contact with other objects and items, and may be prone to being scratched. In the case of cellular telephones, a user may place the phone in the user's pocket or purse along with potentially other sharp items, such as, for example, keys, nail files, key chains, coins, pens and other objects. There is a need to protect the screens of these electronic devices, and prior art devices have used a film that is placed on the screen surface, the film being attached to the surface statically or with the use of an adhesive.

There are drawbacks with the prior screen protectors. Screen protectors require that the screen surface be cleaned and that it be free from any dust or debris. The presence of dust or other particles on the screen surface will come between the screen protector and the touch screen surface and impair or compromise the viewing quality. If dust particles are present, often the screen protector is raised by the dust particle to be off of the surface of the touch screen. This results in an occurrence of what may be referred to as "tenting" around the dust particle, creating a bubble. The bubbles created impair the viewability of the screen, as the bubbles may be noticeable and interfere with a user's ability to view the screen in those locations where the bubbles are present. In addition, the presence of bubbles may hamper the ability of the screen protector to remain secured to the screen surface.

U.S. Patent Application 2012/0043015, published on Feb. 23, 2012, discloses a method and apparatus for protecting an electronic device. The '015 disclosure specifies an adhesive and a mechanical smoothing device (i.e., a squeegee) for applying the film onto a screen. In addition, the '015 method and apparatus require the elimination of debris and fingerprints prior to applying or reapplying the film. Aside from being time consuming to use and apply because the display surface must be cleaned before the film is installed, in environments where dust is present, such as, on a battlefield, in a war zone, factory, or other locations where cleaning items are not readily available or practical to use, the '015 device and method are not suitable. Another aspect of the '015 apparatus is that the film is disclosed to be elastic and highly conformable so that the film may be applied to complex geometries.

U.S. Patent Application 2007/0077420, published on Apr. 5, 2007, discloses a polyether aliphatic urethane film for protection of exposed surfaces of automobiles, trailers and boats that may come into contact with environmental hazards (such as dirt, dust, rocks, sand road salt, bird droppings). The '420 application discloses a base layer that may be a polyether aliphatic urethane, and a base layer that may be made of laminated or combined layers. The '420 application discloses a topcoat that may be applied to the base layer and which may comprise a resin. The application of the '420 protective film is designed for automobiles, including the leading edges of automobile hoods.

U.S. Patent application 2011/0267793 published on Nov. 3, 2011 discloses a protective adhesive film polyurethane sheet with a pressure-sensitive adhesive that includes an acrylate polymer and a silicone macromer disposed on a portion of the first surface of the polyurethane sheet. The '793 application also discloses using a smoothing device to apply the film to a surface. The presence of dust or debris generally will interfere with the smoothing device, and, in many instances, when dust is present on the screen surface, the film is required to be removed, the screen cleaned, and the film reapplied. In many cases, the film may be compromised and cannot be reapplied due to surface dirt becoming embedded on the film surface. Consequently, a new sheet of film is needed when the film becomes compromised. Even fingerprints may cause problems in applying films to a display surface.

U.S. Pat. No. 7,070,837, issued on Jul. 4, 2006, discloses a screen protector for preventing interference patterns (e.g., Newton rings) from arising when the film touches the screen. The '837 patent discloses a hard plastic film, such as PET, is used as the protective film, and a non-uniform urethane resin is disposed on a lower surface in contact with the screen. The '837 device provides a roughened surface on the film so that the majority of the film surface facing the screen does not substantially touch the screen. The '837 disclosure also specifies that no adhesive or adhesive forces are used to hold the film to the screen.

U.S. Patent Application 2011/0043727 published on Feb. 24, 2011, discloses an adhesive layer for multilayer optical article. The adhesive layer is disposed between optical article's multilayer optical film and the light transmissive support layer of a display, such as an LCD television. The '727 discloses the use of glass as a potential component of the multilayer optical article and is part of an article that is assembled as a display device. In addition, the '727 application discloses a method of making display devices including the optical article.

U.S. Patent Application 2011/0129643, published on Jun. 2, 2011, discloses a surface protective sheet for a metal plate, a resin plate or glass plate that includes a high tack adhesive or high anchoring force, and that provides a preferred haze value of 20% to 80%. The '643 disclosure identifies two outer layers of polyethylene which sandwich a middle mechanical property control layer that may consist of urethane.

One attempt to address the presence of dust particles has been disclosed in U.S. Pat. No. 8,044,942, issued on Oct. 25, 2011, for a touch screen protector which provides a spacer along an outer perimeter of a plastic film surrounding a transparent window and having a thickness sufficient to space the plastic film near but not in contact with the touch screen.

There are drawbacks with the prior devices, and none of the prior devices has been found to be completely suitable. A need exists for an improved touch screen protector that can be readily and easily applied to and removed from a touch screen surface in conditions of uncontrolled environments without compromising the optical quality.

SUMMARY OF THE INVENTION

A screen protector film is provided for fast, bubble-free, field installation of the screen protector film onto the surface of a touch screen display, such as a display of a laptop, tablet, cell phone or other touchscreen portable devices. The screen protector film may be used on the surfaces of electronic touch screen displays in order to protect the displays from dirt, debris and other potentially abrasive objects that may come into contact with the display.

It is an object of the present invention to provide a multilayer screen protector that is suitable for high wear and uncontrolled environments, such as, those settings commonly found where medical, military and industrial operations are carried out. In these types of environments, high resistance to abrasion along with fast and easy installation are required without compromising the optical quality as a result of impediments, such as, dirt or dust, that may be present in the environment, as may be likely in the case of a factory or in a war zone.

It is an object of the invention to provide a screen protector that may be readily and easily installed on a screen display, and which may be removed, replaced, or reinstalled.

It is another object of the present invention to provide a screen protector that provides protection against abrasion and surface abuse, and which provides optical clarity for viewing the display screen that the screen protector is guarding.

Another object of the invention is to provide a screen protector that can pass MIL-STD-810F Method 510.4, which involves a blowing sand test. The test is part of the "Department of Defense Test Method Standard for Environmental Engineering Considerations and Laboratory Tests" and is a standards test for environmental conditions that seeks to replicate the effects of environments on the equipment. The MIL-STD-810 test series are approved for use by departments and agencies of the United States Department of Defense (DoD).

It is another object of the invention to accomplish the above objects by providing a screen protector that may be easily and readily installed, removed and re-installed by the user in the user's operating environment.

It is another object of the invention to accomplish the above objects where the screen protector may be installed on a display screen without additional installation aids or chemicals.

It is another object of the invention to accomplish the above objects where the screen protector may be installed on a screen display that has dust or fingerprints on the display, and still provide an optically suitable, clear and/or bubble-free surface.

It is another object of the present invention to accomplish the above objects where a protective layer is provided as a uniform top layer with a top surface that provides resistance to abrasion and may be layered as a laminate with a supportive layer, where the uniformity of the top layer provides optical clarity and uniformity over the screen protector, and, in particular, the screen protector portion that covers a display screen.

BRIEF DESCRIPTION OF THE DRAWING FIGURES

DETAILED DESCRIPTION OF THE INVENTION

Figure 1:
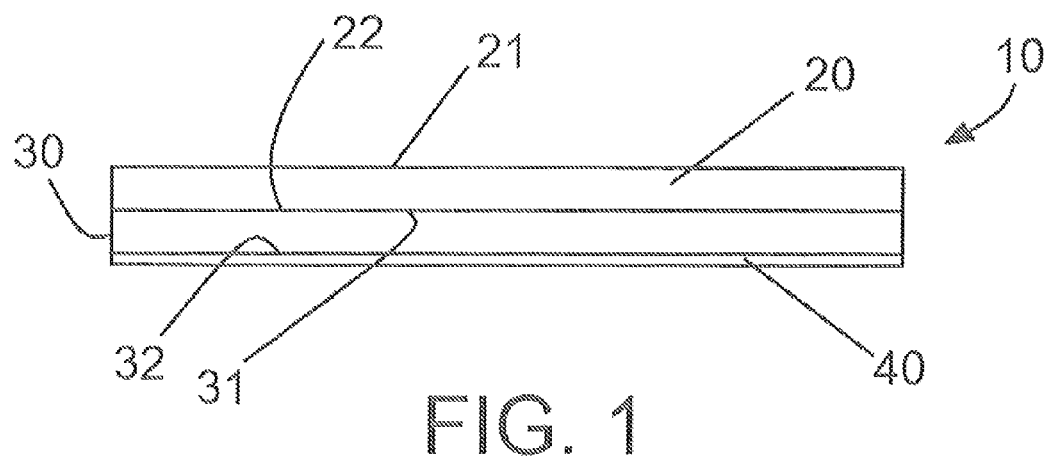
FIG. 1 is a right side elevation view of a screen protector film according to my invention.

Referring to FIG. 1, a multilayer screen protector 10 is shown having a top layer 20, a bottom layer 30 and an adhesive layer 40. The top layer has a top surface 21 and a bottom surface 22. The bottom layer 30 has a top surface 31 and a bottom surface 32. The adhesive layer 40 is provided on the bottom surface 32 of the bottom layer 30. The adhesive layer 40 is comprised of an adhesive that is a low tack adhesive that provides suitable adhesion of the screen protector to a display surface, but which also allows the screen protector 10, once installed on the surface of a display, to be removed and reinstalled. According to preferred embodiments, the screen protector 10 is constructed as a planar structure.

According to the preferred embodiment, the adhesive that forms the adhesive layer 40 is a self-wetting adhesive. According to a preferred embodiment, the peel adhesion of the adhesive layer is less than about 10 oz/in, and preferably less than 5 oz/in. In the more preferred embodiments, the peel adhesion of the screen protector 10 with the adhesive is about 1 oz/in or less. According to one preferred embodiment, peel adhesion of the adhesive is substantially less than 1.0 oz/in, and, according to a most preferred embodiment, the peel adhesion is 0.2 oz/in. The peel adhesion force of the self-wetting adhesive is obtained through ASTM D-3330, which utilizes a 180 degree peel adhesion Test Method A for single coated tapes, wherein an adhesive backed item is adhered to a glass plate (or steel plate) and is then removed by moving the plate at a specified rate, while recording the average force required for peeling the item from the plate. For example, the ASTM D-3330 test may be carried out by adhering the specimen to a testing plate, folding an end of the specimen to create a tab parallel to the plate, securing the end of the plate furthest away from the tab to the moving grip, securing the tab to the static grip, peeling the tape at a 180 degree angle by moving the plate at the specified rate, and recording the average force required for peeling. The peel adhesion for the adhesive is for a laminate 10 consisting of a top layer 20 made of urethane, and preferably, polycaprolactone aliphatic urethane (PAU), a bottom layer 30 made of a plastic, and preferably, polyethylene terephthalate, with the adhesive provided on the bottom surface 32 of the bottom layer 30. An example of a suitable adhesive that may be used and applied to achieve the desired peel adhesion forces and provide the self-wetting properties is an acrylic based self-wetting adhesive. According to one preferred embodiment, a preferred self-wetting adhesive that may be utilized comprises (a) a pre-polymerized cross-linkable non-water soluble acrylic based pressure sensitive adhesive, (b) a cross-linking agent selected from the group consisting of metal chelates, silanes, epoxy-functional compounds, aziridine compounds, multifunctional amines, alkyl halide compounds, multifunctional acids, multifunctional mercaptans, multifunctional epoxy compounds, polyols in the presence of a catalyst, and combinations thereof and (c) a polyol having a weight average molecular weight in the range from 1,000 g/mol to 10,000 g/mol.

The screen protector 10 preferably may be applied to a screen display surface in the presence of dirt or dust on the screen display. Dust and dirt are components common to a number of working environments, in particular, such as, for example, on the military fields of operations, in factories, outdoor environments, sporting events (e.g., fields and tracks). Often, there are not the resources, time or facilities by which to remove the dust, dirt, fingerprints and other interfering items that may be present on the screen display prior to installation of a screen protector. The screen protector 10 includes a layer 40 that consists of a low tack adhesive that is self-wetting and preferably wets out over the display surface to promote the attachment of the protector 10 onto a display screen.

The screen protector 10 has a top layer 20 that is a protective layer that resists abrasion and provides increased resistance to harsh environments and high-wear conditions. The military battlefield is one example of a high-wear environment where abrasive conditions are often encountered by the screen protector 10 and device on which it may be installed. According to a preferred embodiment, the screen protector 10 has a top layer 20 that is made from urethane, and more preferably from polycaprolactone aliphatic urethane (PAU), which is a highly abrasive-resistant material. According to a preferred embodiment, the PAU top layer has a thickness of from 1 mil to 8 mil (0.0254 mm to 0.2032 mm). The polycaprolactone aliphatic urethane layer 20 preferably is thin and is supported by the bottom layer 30.

The screen protector bottom layer 30 represents the structural layer that supports the polycaprolactone aliphatic urethane layer 20. The illustration in FIG. 1 shows the polycaprolactone aliphatic urethane layer 20 supported directly on the bottom layer 30. The bottom layer 30 is a hard plastic structural layer which is constructed from a rigid plastic material, and which, preferably, may be constructed from a plastic material, such as, for example, a hard clear plastic, preferably from plastic materials selected from the group consisting of acrylic and polystyrene. According to one preferred embodiment, another material from which the bottom layer 30 may be made is polyethylene terephthalate. According to a preferred embodiment, the bottom layer 30 has a thickness of from about 0.5 mils to 8 mils (0.0127 mm to 0.2032 mm).

The bottom layer 30 and top layer 20 are connected together. According to a preferred embodiment, the top layer 20 and bottom layer 30 are co-extruded so that the layers 20, 30 form a multi-layer laminate layer. According to a preferred embodiment, the multi-layer laminate formed from the two layers now includes the top surface 21 that is an abrasive resistant polycaprolactone aliphatic urethane surface on the top polycaprolactone aliphatic urethane layer 20, and the bottom surface 32 that is the plastic surface of the plastic bottom layer 30. The hard plastic bottom layer 30 provides suitable rigidity for the screen protector 10. The polycaprolactone aliphatic urethane surface 21 and the polycaprolactone aliphatic urethane top layer 20 are supported by the rigid plastic bottom layer 30. The laminate formed consisting of the polycaprolactone aliphatic urethane top layer 20 and plastic bottom layer 30 has the abrasion resistant top surface 21 and the supportive bottom layer 30. The top layer 20 preferably is a thin layer of polycaprolactone aliphatic urethane and provides abrasion resistance and optical clarity as a uniform layer in conjunction with the supporting structure, which is the plastic bottom layer 30, that preferably also is a uniform layer, so that the screen protector 10 is a film having excellent optical clarity qualities as well as superior abrasion resistance.

The securing together of the top layer 20 and bottom layer 30 is accomplished to maintain the optical clarity of the laminate. According to a preferred embodiment, a laminate of coextruded polycaprolactone aliphatic urethane and rigid plastic is formed having optically clear properties, to which the adhesive layer 40 is applied to form the screen protector 10. According to a preferred embodiment, the top layer 20 and bottom layer 30 are secured together without an additional component between the layers. According to an alternate embodiment, a bonding agent or adhesive may be used to accomplish the lamination of the top layer 20 and the bottom layer 30. A high tack aggressive adhesive, such as, for example, acrylic adhesives, may be used in order to bond the top layer 20 to the bottom layer 30. In this example, the aggressive adhesive secures the bottom surface 22 of the top layer 20 to the top surface 31 of the bottom layer 30. According to one embodiment, the top layer, such as, for example, the layer of polycaprolactone aliphatic urethane, may be provided with an aggressive, high tack adhesive thereon, on the bottom surface 22. A wet or dry lamination process may then be used to adhere the polycaprolactone urethane layer 20 to the bottom layer 30. According to one embodiment, the lamination of the top layer 20 and bottom layer 30 may be carried out using a wet lamination procedure where the aid of a water/surfactant blend is used to minimize imperfections that may be present in the lamination. Other suitable methods may be employed to laminate the top layer 20 and bottom layer 30.

The screen protector 10 according to a preferred embodiment consists of a coextruded polycaprolactone aliphatic urethane top layer 20 and a plastic bottom layer 30 secured together to form a film, the film having structural rigidity and having a durable, clear and abrasion-resistant surface 21. According to a preferred embodiment, the plastic layer may be a hard layer, but generally is a poor abrasion protection agent. The plastic layer provides structural support for the polycaprolactone aliphatic urethane layer. Preferably, the formed laminate screen protector 10 is a planar structure suitable for installation on a flat surface. The construction of the layers and the film 10 provides an optically clear and uniform abrasion resistant surface. The present screen protector 10 is abrasion resistant and may be readily installed on a display screen in almost any environment and without the need for tools.

The adhesive layer 40 is applied on the bottom surface 32 of the bottom layer 30 to form the screen protector 10. Preferably, the adhesive is a self-wetting adhesive. The adhesive may be applied by any suitable method for applying adhesives to a surface, including, for example, rolling or spraying the adhesive onto the bottom surface 32. Other examples of adhesive application include gravure coating, air knife, hot melt, curtain, reverse roll or any other method suitable to this application. Although not shown, a release material or backing, such as release paper, may be removably installed on the adhesive layer 40 to provide protection of the layer 40 prior to the time that the screen protector 10 is actually installed on a display screen. The release paper may comprise a suitable composition that is compatible with the adhesive, and which will not degrade or break down when coming into contact with the adhesive layer 40 that the backing is provided to protect. The adhesive, according to the preferred embodiments, is a low tack adhesive with limited gripping power to permit the screen protector 10 to be easily and quickly removed from a screen display surface and re-installed in the field if necessary, while still providing sufficient gripping to prevent accidental removal from the display screen on which the screen protector 10 is attached. According to a preferred embodiment, the screen protector 10 is attached to a display with an adhesive which provides a relatively low bond of less than 10 oz per inch of peel adhesion, and more preferably, less than 5 oz per inch of peel adhesion, and according to a most preferred embodiment, the adhesive has a peel adhesion of about 0.2 oz per inch. The adhesive also provides the ability to remove and replace the screen protector 10 on a display without the need to remove the adhesive from the surface of the screen display. The adhesive is not applied to the polycaprolactone aliphatic urethane top layer 20, but rather is applied to the hard plastic structural layer, the bottom layer 30, which, according to preferred embodiments, may be a polystyrene or acrylic layer or a PET layer. According to one embodiment, the adhesive 40 is applied to the bottom layer surface 32 of the structural or bottom layer 30 and the structural layer 30 is then connected to the top layer 20 through a co-extrusion process. According to another embodiment, the structural layer 30 is connected to the top layer 20 through a co-extrusion process, and the adhesive layer 40 is applied to the bottom layer surface 32.

The screen protector 10 may be applied to virtually any display surface to prevent abrasion. The screen protector 10 provides improved resistance to scratching and allows for improved ease of installation. The construction of the screen protector 10 also provides remedial solutions for improper installation or errors, in that the adhesive composition and placement in conjunction with the bottom layer 30 remains active for reinstallation or repositioning of the screen protector 10 on a screen display.

Figure 2:
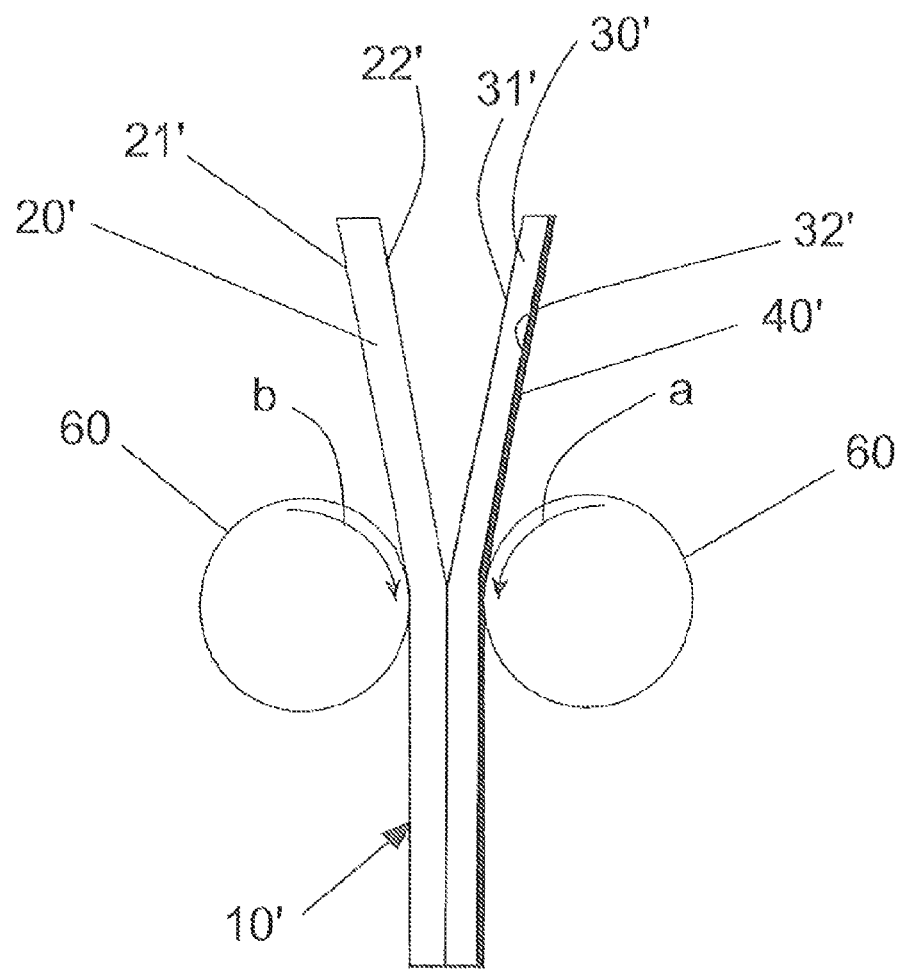
FIG. 2 is a schematic illustration of an exemplary process arrangement for attaching the layers of the multilayer screen protector.

The lamination of the top layer 20 and bottom layer 30 may be carried out using any process suitable to the application. An exemplary lamination embodiment is illustrated in FIG. 2, where, according to the exemplary embodiment illustrated, a laminate 10' is shown consisting of a layer of polycaprolactone aliphatic urethane (PAU) 20' and a layer of plastic 30'. The laminate 10' is shown extruded from the rollers 60 apply pressure to secure the polycaprolactone aliphatic urethane (PAU) layer 20' and plastic layer 30' together. The rollers 60 may be driven by any conventional driving means, such as, for example chain drives, belt drives, shaft drives or other direct or indirect drives and may be moved with a motor. The rollers 60 are shown having rotational directions indicated by arrows "a" and "b" to drive the polycaprolactone aliphatic urethane (PAU) layer 20' and plastic layer 30' together through the rollers in compressive engagement (and with the adhesive layer 40 also when it is present on the bottom surface 32' of the bottom layer 20'). The lamination may be accomplished in the presence of heat. According to one embodiment, an adhesive layer 40', which is a self-wetting, low tack adhesive, may be applied to the surface 32' of the laminate 10' after the extrusion of the polycaprolactone aliphatic urethane (PAU) layer 20' and plastic layer 30', or, alternately, may be provided on the bottom surface 32' of the plastic layer 30', before the lamination together of the polycaprolactone aliphatic urethane (PAU) layer 20' and plastic layer 30'. A cutter, not shown, may be placed in line downstream of the rollers 60 to cut the laminate 10' into suitable lengths or pieces (or screen protector configurations, including cut outs). The screen protector 10' may be cut and configured to the dimensions of a screen display, and used as the screen protector 10 shown and described herein. In FIG. 2. 21' corresponds to 21, 22' corresponds to 22, and 31' corresponds to 31.

Example 1

A screen protector of the present invention was constructed from a polycaprolactone aliphatic urethane layer and a PET layer. A self-wetting adhesive consisting of an acrylic pressure sensitive adhesive was applied to the bottom surface of a 0.002" PET layer. A release liner was applied over the adhesive layer on the bottom surface of the PET layer. A 0.006" polycaprolactone aliphatic urethane layer was laminated to the PET layer. A roll of the multi-layer film was formed. A screen protector was cut from the roll stock using die cutters, drag knife, tangential knife, or laser cutters to provide a screen protector having mating dimensions to cover a touch screen of a cellular telephone. Mating cutouts for a home button, a speaker, microphone, and front camera were made in the screen protector.

The screen protector was subjected to an ASTM D3330 peel adhesion test, and the peel adhesion was determined to be 0.2 oz/inch. The screen protector exhibited good self-wetting properties as well as resistance to external factors such as dust, fingerprints, and dirt, while maintaining optical quality. The screen protector was also subjected to MIL-STD-810F Method 510.4, a blowing sand test, and exhibited excellent resistance to abrasion. Optical clarity was maintained.

According to preferred embodiments, the first layer of polycaprolactone aliphatic polyurethane is an optically clear layer. The supporting layer preferably works in conjunction with the optical capabilities of the first polycaprolactone aliphatic polyurethane layer to maintain the optical clarity of the layer and screen protector and to provide a structural bed for the abrasion resistant layer.

According to preferred embodiments, the screen protectors are constructed by bringing together the optically clear top layer 20 of polycaprolactone aliphatic polyurethane with the bottom layer 30 consisting of an acrylic or polystyrene layer, and with the self-wetting adhesive layer on the bottom surface 32 of the bottom layer 30 to provide a three-layer screen protector 10 with a non-reflective top surface 21 and having non-reflective surface properties when installed on a screen of an electronic device. The construction of the screen protector 10 is designed to maintain and produce the properties desirable for non-reflectiveness as well as abrasion resistance and ease of field installation.

According to a preferred embodiment, the screen protector 10 is designed and die-cut to match the shape of the digital display screen and includes cut-outs for cameras, microphones, buttons and the like.

The multi-layer screen protector 10 may be applied to digital display screens, such as LCD's, displays of cell phones, tablets, laptops and pad computer devices, including touch screens. The screen protector 10 may be readily applied to a display surface without the need for special tools, and may be installed in dusty environments. The screen protector 10 is designed and die-cut to match the shape of the digital display screen, including having cut-outs for cameras, microphones, speakers, and device buttons.

These and other advantages may be obtained through the use of the inventive apparatus and methods disclosed herein. While the invention has been described with reference to specific embodiments, the description is illustrative and is not to be construed as limiting the scope of the invention. Various modifications and changes may occur to those skilled in the art without departing from the spirit and scope of the invention described herein and as defined by the appended claims.

What is claimed is:

1. A protective film for an electronic display, the protective film comprising:
    a first layer having a top and a bottom, wherein said top forms a protective outer surface layer of said protective film;
    said first layer being made from urethane,
    a second layer having a top and a bottom, said bottom forming the bottom surface of the second layer;
    said second layer being made from an optically clear supporting plastic material,
    wherein said first layer and said second layer form a laminated film wherein said first layer and said second layer are laminated together by a high tack adhesive to form said laminated film so that said bottom of said first layer and said top of said second layer are engaged, and wherein said first layer top forms the top surface of said laminated film, and wherein said second layer bottom surface forms the bottom surface of said laminated film; and a self-wetting adhesive provided on said bottom surface of said laminated film;

wherein said first urethane layer is made from a polycaprolactone aliphatic polyurethane and wherein said second layer is a material selected from the group consisting of acrylic, polystyrene, and polyethylene terephthalate, and wherein said first layer bottom surface is attached to said second layer top surface and said self-wetting adhesive is provided on said second layer bottom surface;

wherein said first layer of polycaprolactone aliphatic polyurethane is an optically clear layer;

wherein said optically clear first layer together with said second layer and said self-wetting adhesive layer comprise a three-layer protective film that is optically clear and has the protective outer surface layer that is resistant to abrasion; and wherein the thickness of the protective film combined is from 1.5 mils to 16 mils.

2. The protective film of claim 1, wherein said protective film is for an electronic display having a surface profile or a screen, and wherein said protective film is planar and has a profile that corresponds with the surface profile or the screen.

3. The protective film of claim 1 wherein said protective film has a peel adhesion of less than 1.0 oz/in as measured per ASTM D-3330.

4. The protective film of claim 1 wherein said protective film has a peel adhesion of 0.2 oz/in as measured per ASTM D-3330.

5. The protective film of claim 1, wherein said self-wetting adhesive consists of a low tack adhesive, and wherein said self-wetting adhesive provided on said bottom surface of said optically clear plastic material provides for removal and reinstallation of said protective film on said electronic display; wherein said self-wetting adhesive wets out over said electronic display when said protective film is placed on said display.

6. The protective film of claim 1, wherein said self-wetting adhesive is capable of removably securing the protective film to a surface of the electronic display with minimal or no external pressure.

7. The protective film of claim 1, wherein said self-wetting adhesive comprises (a) a pre-polymerized cross-linkable non-water soluble acrylic based pressure sensitive adhesive, (b) a cross-linking agent selected from the group consisting of metal chelates, silanes, epoxy-functional compounds, aziridine compounds, multifunctional amines, alkyl halide compounds, multifunctional acids, multifunctional mercaptans, multifunctional epoxy compounds; polyols in the presence of a catalyst, and combinations thereof and (c) a polyol having a weight average molecular weight in the range from 1,000 g/mol to 10,000 g/mol.

8. The protective film of claim 1, wherein said polycaprolactone aliphatic polyurethane layer is a layer having uniform thickness and having a top surface which is smooth and a bottom surface which is smooth, and wherein said second layer has a uniform thickness.

9. A protective film for an electronic display having a viewing area, the protective film comprising:

a first layer having a top and a bottom, wherein said top forms a protective outer surface layer of said protective film;

said first layer being made from urethane, wherein said urethane consists essentially of polycaprolactone aliphatic polyurethane;

a second layer having a top and a bottom, said bottom forming the bottom surface of the second layer, said second layer being made from an optically clear supporting plastic material, wherein said plastic material is selected from the group consisting of acrylic, polystyrene and polyethylene terephthalate;

wherein said first layer and said second layer form a laminated film wherein said first layer and said second layer are laminated together by a high tack adhesive to form said laminated film so that said bottom of said first layer and said top of said second layer are secured together;

wherein said first layer top forms a top surface of said laminated film;

wherein said second layer bottom surface forms a bottom surface of said laminated film; and a self-wetting adhesive provided on said bottom surface of said laminated film;

wherein said protective film is cut to a shape that matches the display surface which it is meant to protect;

wherein said protective film is planar and has a profile that corresponds with the surface profile of an electronic device or a screen of an electronic device;

wherein said protective film has a peel adhesion of 0.2 oz/in as measured per ASTM D-3330;

wherein said self-wetting adhesive consists of a low tack adhesive, and wherein said self-wetting adhesive provided on said bottom surface of said laminated film provides for removal and reinstallation of said protective film on said electronic display;

wherein said low tack adhesive is capable of removably securing the protective film to a surface of a screen display surface with minimal or no external pressure;

wherein said low tack adhesive comprises (a) a pre-polymerized cross-linkable non-water soluble acrylic based pressure sensitive adhesive, (b) a cross-linking agent selected from the group consisting of metal chelates, silanes, epoxy-functional compounds, aziridine compounds, multifunctional amines, alkyl halide compounds, multifunctional acids, multifunctional mercaptans, multifunctional epoxy compounds, polyols in the presence of a catalyst, and combinations thereof and (c) a polyol having a weight average molecular weight in the range from 1,000 g/mol to 10,000 g/mol;

wherein said first layer bottom surface is attached to said second layer top surface and said self-wetting low tack adhesive is provided on said second layer bottom surface;

wherein said first layer of polycaprolactone aliphatic polyurethane is an optically clear layer;

wherein said polycaprolactone aliphatic polyurethane first layer is a layer having uniform thickness and having a top surface which is smooth and a bottom surface which is smooth, and wherein said second layer has a uniform thickness;

wherein said protective film has an area that covers said electronic display and wherein the protective film has a zone of coverage comprising the protective film area that covers the viewing area of said electronic display, and wherein said zone of coverage comprises said first layer having a uniform thickness and said second layer having a uniform thickness and having a smooth bottom surface, said self-wetting adhesive being provided on said smooth second layer bottom surface;

wherein the first layer has a thickness of from 1 mil to 8 mils; and wherein the second layer has a thickness of from 0.5 mil to 8 mils.

* * * * *